United States Patent
Dowsett et al.

(10) Patent No.: US 6,324,285 B1
(45) Date of Patent: Nov. 27, 2001

(54) CRADLE FOR A HANDSET

(75) Inventors: Alan Clifford Dowsett, Lancing; Neil James, Worthing; Robert Bassil, Warwick, all of (GB)

(73) Assignee: Aerotech IFE Limited, Brighton (GB)

( * ) Notice: Subject to any disclaimer, the term of this patent is extended or adjusted under 35 U.S.C. 154(b) by 0 days.

(21) Appl. No.: 09/242,782
(22) PCT Filed: Aug. 29, 1997
(86) PCT No.: PCT/GB97/02337
§ 371 Date: Jun. 10, 1999
§ 102(e) Date: Jun. 10, 1999
(87) PCT Pub. No.: WO98/09415
PCT Pub. Date: Mar. 5, 1998

(30) Foreign Application Priority Data

Aug. 30, 1996 (GB) ................................... 9618149
Dec. 11, 1996 (GB) ................................... 9625786
Apr. 11, 1997 (GB) ................................... 9707344

(51) Int. Cl.⁷ .................................................. H04M 1/00
(52) U.S. Cl. ........................ 379/455; 242/400; 379/446
(58) Field of Search ..................... 379/453–455, 379/456–458, 446, 426; 242/328, 523, 377, 375.2, 376, 381, 382, 529, 388.3, 396.2, 396.4, 396.5, 396.8, 396.9; 192/65; 191/12.4, 12.2; 254/391

(56) References Cited

U.S. PATENT DOCUMENTS

| 3,640,363 | * | 2/1972 | Spalding | 192/65 |
| 4,485,278 | * | 11/1984 | Schaller et al. | 191/12.4 |
| 5,109,412 | | 4/1992 | Hollowed et al. | 379/455 |
| 5,128,993 | | 7/1992 | Skowronski | 379/438 |
| 5,155,766 | * | 10/1992 | Skowronski | 379/438 |
| 5,299,670 | * | 4/1994 | Willard | 191/12.2 R |
| 5,410,597 | | 4/1995 | Kepley, III et al. | 379/449 |
| 5,652,792 | * | 7/1997 | Gallagher et al. | 379/446 |
| 5,701,981 | * | 12/1997 | Marshall et al. | 191/12.4 |
| 5,835,127 | * | 11/1998 | Boothe et al. | 348/8 |
| 5,865,503 | * | 2/1999 | Shields | 297/188.14 |
| 6,082,656 | * | 7/2000 | Thornton | 242/385 |

FOREIGN PATENT DOCUMENTS

| 0319497 | * | 6/1989 | (EP) | B65H/75/44 |
| 0493736 | | 7/1992 | (EP) | . |
| 0493736 A2 | * | 7/1992 | (EP) | B65H/75/74 |
| 0771692 | | 7/1997 | (EP) | . |
| 2210020 | | 6/1989 | (GB) | . |
| 2210020 A | * | 6/1989 | (GB) | B65H/75/34 |
| WO 95/29552 | * | 11/1995 | (WO) | H04M/11/00 |

* cited by examiner

Primary Examiner—Jack Chiang
Assistant Examiner—Nora J. Putt
(74) Attorney, Agent, or Firm—Dean W. Russell; Kilpatrick Stockton LLP

(57) ABSTRACT

A cradle 13 for a handset for a telephone or other electronic apparatus is dimensioned to fit within a chair arm, for example an aircraft seat arm. The cradle includes an integral cord spool 16 having a rewind bias spring 34, and a catch (not shown) for maintaining the handset in the cradle. The cord is locked in an extended condition by a braking cam 53, releasable for rewinding the cord by a pushbutton 36. Latching means 54 are provided for maintaining the pushbutton depressed until the cord is rewound. Other brake and latching means, including a ratchet and pawl arrangement, are disclosed.

12 Claims, 15 Drawing Sheets

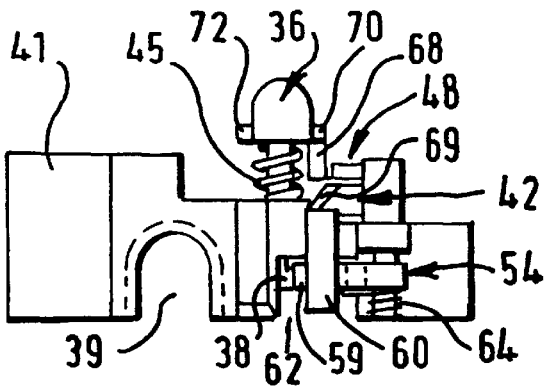
FIG.13
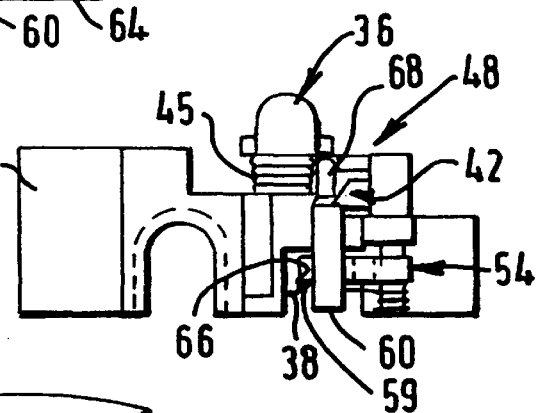
FIG.14
FIG.15
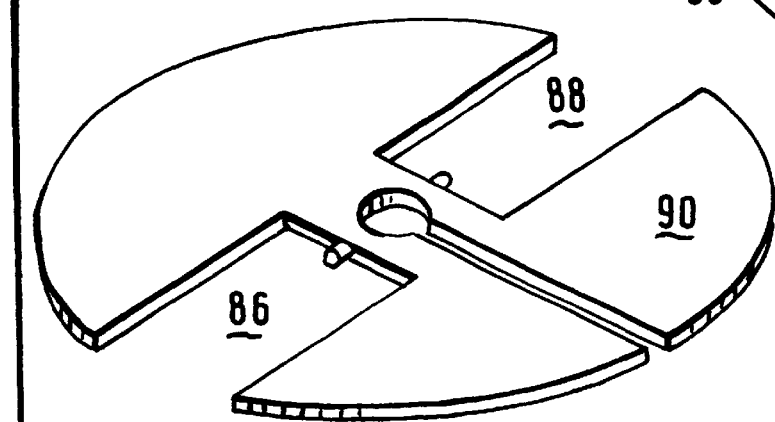
FIG.16
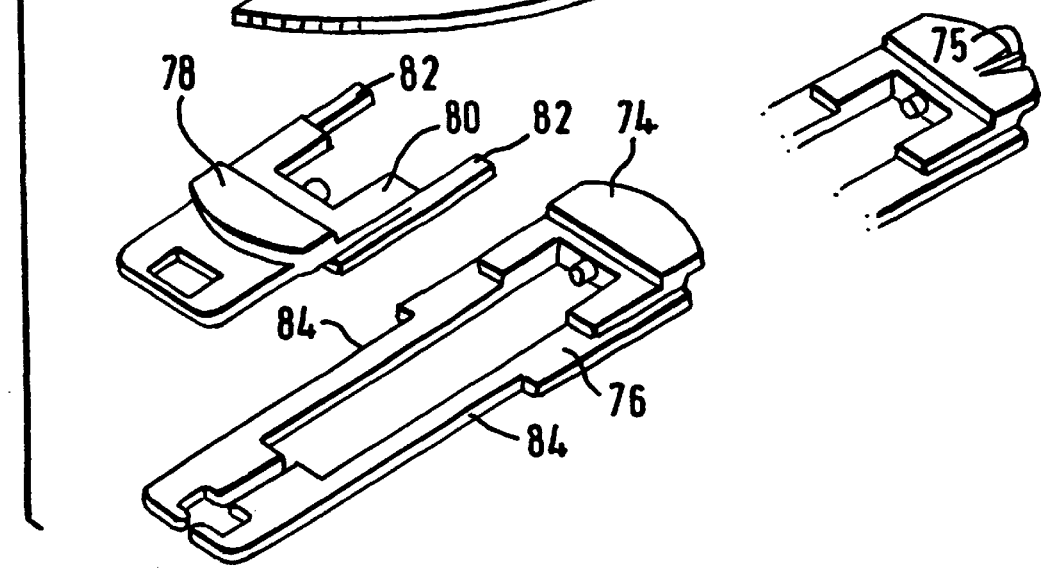

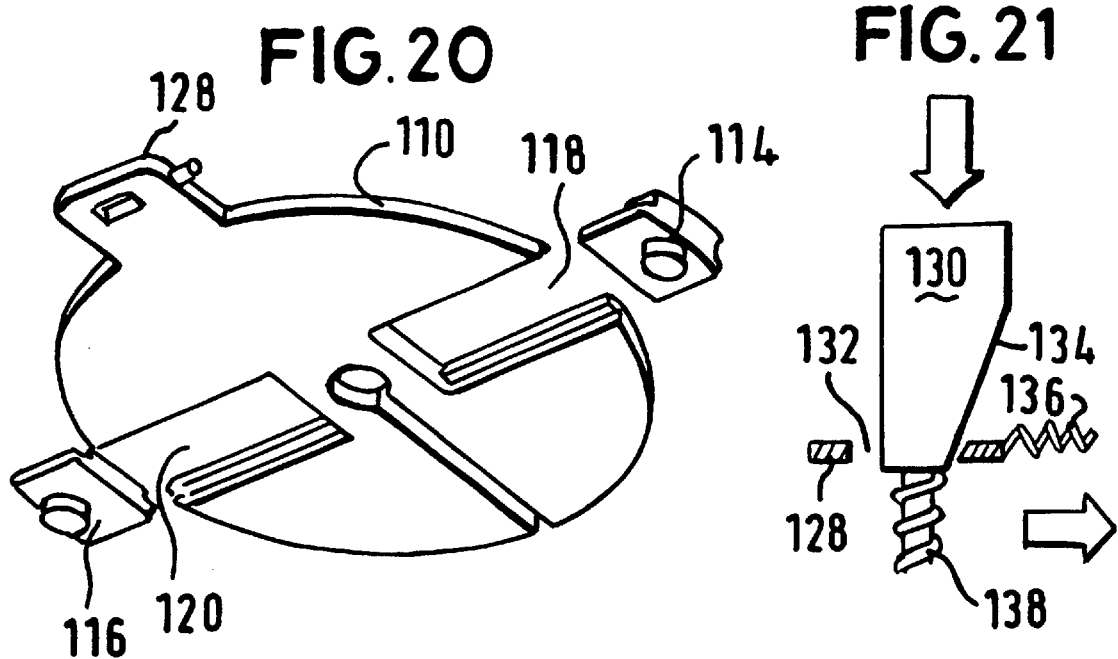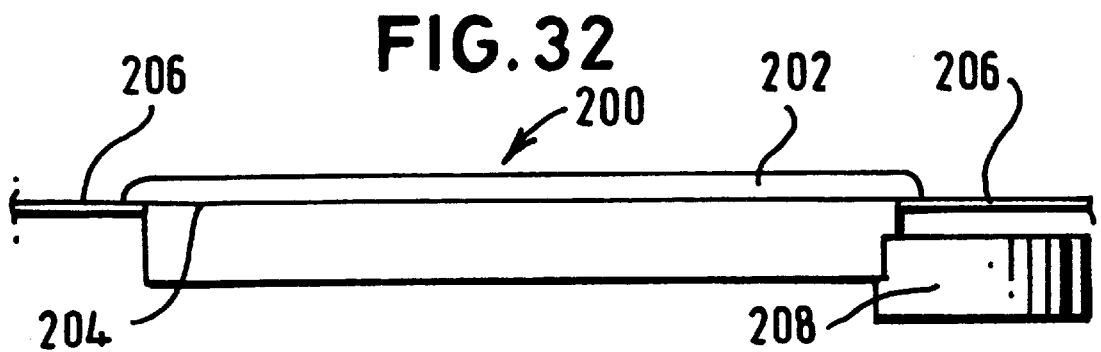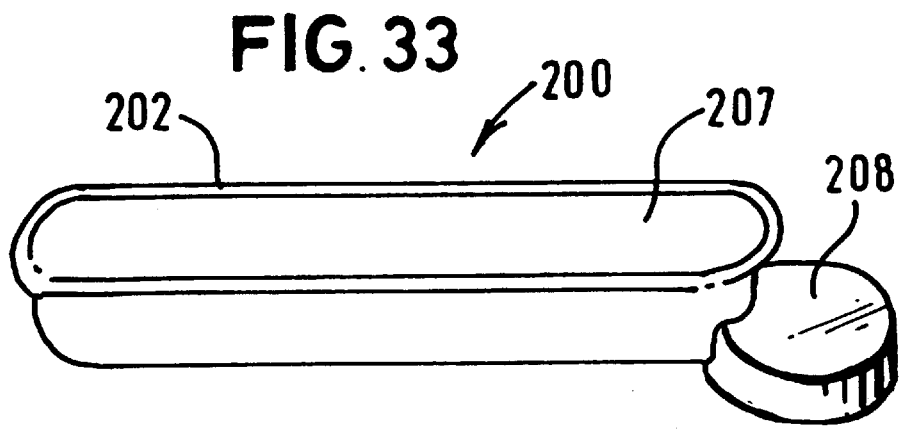

CRADLE FOR A HANDSET

In a first aspect, this invention relates to a cradle for a handset, such as a telephone handset or remote control for electronic apparatus, and is particularly applicable to cradles for mounting in the armrests of chairs.

In the following "chair" includes all seating apparatus incorporating an arm (whether extending from a back of the chair, the seat of the chair, or both) and, for example, includes but is not limited to: seats in all modes of mass transport including aircraft, buses, rail and passenger vessels; seats in facilities for audience participation, such as theatres, arenas, lecture theatres and libraries; and seats for personal business or domestic use such as workstation chairs, and settees.

It is known to provide a cradle in the armrest of a chair, such as a seat in an aircraft, for housing a handset comprising, for example, a telephone and/or a remote controller for in-flight entertainment apparatus. Such handsets can also include call functions for the in-flight staff. A typical example is the model RU-AA6501-01 of Matsushita Electrical Industrial Company Limited of Osaka, Japan.

Conventionally such handsets sit and are cradled in a recess in an arm mounted cradle and are removable from the recess by lifting. The handset is electrically powered and connected via a cable which is housed in and may be drawn from a cable reel. The cable reel is conventionally of the ratchet type so that when the handset is lifted from the cradle the cable may be extended to a desired extent and locks in that position. To return the cable to the reel the cable is tugged to release the ratchet and then released so allowing a spring mechanism in the reel to draw the cable back into the reel. FIG. 1 illustrates schematically the conventional arrangement of handset, cradle and reel. FIG. 2 shows a typical arrangement with the cable reel mounted to the rear of a chair arm and FIG. 3 shows a further typical arrangement with the cable reel mounted under the seat. The cable passes through a reinforced but flexible conduit extending from the cradle to the reel.

This conventional arrangement causes some problems.
1. In both locations of the cable reel, separate mounting of the cradle and the reel, and the need to ensure free passage for the cable between the cradle and the reel, leads to time consuming installation and servicing particularly as the cable can quickly become damaged if installation or servicing is defective.
2. Because the cable reel is remote from the cradle, cable reels have been of the above mentioned ratchet type. Many people do not understand how the ratchet mechanism works and as a consequence the handset is frequently not properly stowed leading to damage to the cable. Such incorrect stowing can contravene air safety regulations.
3. In the under seat location of FIG. 3 there is the additional installation problem of needing to carefully route the cable in its conduit to prevent damage by the seat mechanism. The long and sometimes convoluted pathways involved can lead to high friction between the cable and its housing conduit which slows down the cable reel and again can lead to high service costs.
4. The arm mounted location of FIG. 2, while desirable, is difficult to engineer. Generally the seat arm is too narrow and also contains other items of "furniture" such as ash trays, audio jacks, seat adjustment controls. Further, this location generally contains arm hinging mechanisms to allow the seat arm to swing up into the seat back.

Telephones with attached cord winding devices have been previously proposed (see U.S. Pat. No. 5,156,242 and U.S. Pat. No. 5,241,593). However these telephones were not amenable to fitting in the arms of chairs; do not restrain the handset in the cradle; and leave wire looping in free space where it can be inadvertently caught.

It has also been proposed to provide a remote control holder for wired remote controls for domestic television apparatus and the like (see U.S. Pat. No. 4,735,377). The holder proposed in U.S. Pat. No. 4,735,377 had a shelf on which the remote controller rested and a cable reel to retract the cable when the remote was not in use. The holder of U.S. Pat. No. 4,735,377 was not amenable to fitting in the arms of chairs and did not restrain the handset in the cradle and no suggestion to do either is made in U.S. Pat. No. 4,735,377. The purpose behind U.S. Pat. No. 4,735,377 was to prevent wires looping around in the domestic environment.

shown for example in U.S. Pat. No. 5,410,597 or U.S. Pat. No. 5,155,766 it is known to provide a combined cord reel and telephone handset cradle assembly for mounting in an aircraft passenger seat back or bulkhead. However such known assemblies are too bulky for incorporation in a standard passenger seat arm.

The applicants have realised that in the chair arm context incorporating the cable reel into the cradle leads to many advantages:
1. There is no need for a protective conduit around the cable and so frictional forces do not limit the take-up of cable.
2. Installation of the cradle is simplified since only electrical (and/or optical) connections need to be made and there is no need to carefully position a mechanical pathway for the cable.
3. Since the cable reel is now adjacent the cradle it becomes feasible, if desired, to use an alternative ratchet mechanism such as a pressbutton release ratchet (see for example GB-A-2210020) which is simpler for the user to understand.
4. The combined unit is far more robust than separate cradle and reel and is less prone to damage by either the user or service personnel.

The applicants have further realised that for robust use it is advantageous to provide a manually releasable catch to secure the handset into its cradle. (In the aircraft environment there is a requirement that the cradle withstand a 16 g crash landing without releasing the handset).

Accordingly the present invention provides a cradle for housing a handset capable of connection to apparatus, the cradle including a body comprising:
 a) recess adapted to releasably receive the handset in a cradled rest position;
 b) a cable reel housed in the body and carrying a retractably extendible cable , the cable being connectable by a first end to the handset, such that in use removal of the handset from its cradled rest position extends the cable from the cable reel, the cable reel being biased for retraction of the cable and comprising a releasable lock to secure the cable at a required length and
 c) a catch to releasably secure the handset in its cradled rest position,
characterised in that the body is adapted to be secured at least partially recessed within a chair arm with the width of the body containable in a surface of the arm no greater than 7.5 cm wide.

It should be noted that the term "cable" in this specification includes the use of optical fibres either additionally or in place of electrical conductors and, for infrared or other wireless transmission systems, include the use of a tether provided to prevent removal of the handset.

In a further aspect, the invention concerns a winding mechanism and a spool braking and release arrangement therefor, such as may be incorporated in a handset cradle having pushbutton operated cable retraction, as discussed above.

GB 2210020 shows a telephone cord windup apparatus for domestic use including a push-button operated cord retraction mechanism. Pressure must be maintained on a push-button in order to release a ratchet brake, permitting retraction of the cord under spring action.

EP 0319497 shows a push-button or pedal operated cable reel for a vacuum cleaner. Depressing the pedal releases a friction brake permitting the cable to rewind. The pedal remains latched in the depressed state until the torque provided by a rewind spring exceeds a predetermined value. Such a rewind mechanism is not suitable for telephone handsets in which the cord is restrained by the user during rewinding and therefore likely to be under relatively high tension.

The present invention further provides a winding mechanism comprising a spool rotatable in one direction against a rewind bias torque;
brake means having:
(i) an operative condition in which rotation of the spool in the rewind direction is braked but rotation of the spool in said one direction is allowed, and
(ii) a released condition in which rotation of the spool in the rewind direction is allowed; release means actuable to change the brake means from the operative to the released condition, and latch means engageable with the release means for holding the release means in the actuated state whereby the brake means are maintained in the released condition;
characterised in that the mechanism forms part of an apparatus comprising a handset and a cradle having a recess in which the handset may be placed, the latch means comprising a trigger arranged in the recess and actuated by placement of the handset into the recess to disengage the latch means from the release means thereby allowing the brake means to change from the released to the operative condition.

In an alternative construction, the invention provides a winding mechanism comprising a spool rotatable in one direction against a rewind bias torque; brake means having:
(i) an operative condition in which rotation of the spool in the rewind direction is braked but rotation of the spool in said one direction is allowed, and
(ii) a released condition in which rotation of the spool in the rewind direction is allowed;
release means actuable to change the brake means from the operative to the released condition, and latch means engageable with the release means for holding the release means in the actuated state whereby the brake means are held in the released condition, characterised in that rotation of the spool in the one direction biases the latch means out of engagement with the release means.

Difficulties have sometimes arisen in exploiting the increased reliability and ease of servicing a handset cradle with integrated cable reel as, to produce a shallow unit for installation in limited spaces, the cord reel has been located laterally of the handset receiving recess (see e.g. U.S. Pat. No. 5155766). This requires a larger installation aperture than a cradle with remotely located cord reel, inhibiting use of a cradle and integrated cord reel in the replacement market, as undesirable reworking of the original installation apertures is required.

In another aspect, the invention provides a cradle for housing a handset, the cradle comprising:
a one piece body having a shoulder for locating the cradle for installation at least partially recessed in an aperture in a mounting panel;
a rearwardly extending recess in the body adapted to releasably receive the handset in a cradled rest position in which the handset is accessible from in front of the mounting panel 1'; and
a cable reel mounted to or in the body and carrying a retractably extendible cable, the cable being connectable by a first end to the handset, such that in use removal of the handset from its cradled rest position extends the cable from the cable reel, the cable reel being biased for retraction of the cable,
characterised in that the cable reel is mounted laterally of the recess and rearwardly of the locating shoulder whereby, the cradle body may be installed in the aperture from in front of the mounting panel and when the cradle is installed, the cable reel is located behind the panel and laterally of the panel aperture; the rotational axis of the cable reel lying in a plane extending substantially longitudinally of the cradle and substantially parallel to the depth of the recess.

Further preferred features of the invention are apparent from the dependent claims and the following description made with reference to the drawings in which:

FIG. 13 is a front view of the assembled reel braking and release mechanism of FIG. 7, showing the brake engaged, as seen from within the handset receiving recess and with other parts omitted for clarity;

FIG. 14 is similar to FIG. 13 but shows the brake disengaged;

FIGS. 15 and 17–19 show a second embodiment of the winding mechanism; with FIG. 16 showing a modification to a brake shoe shown in FIGS. 15 and 17;

FIGS. 20–23 show a third embodiment of the winding mechanism;

FIGS. 32 and 33 show an embodiment of the third aspect of the invention.

Figure 1:
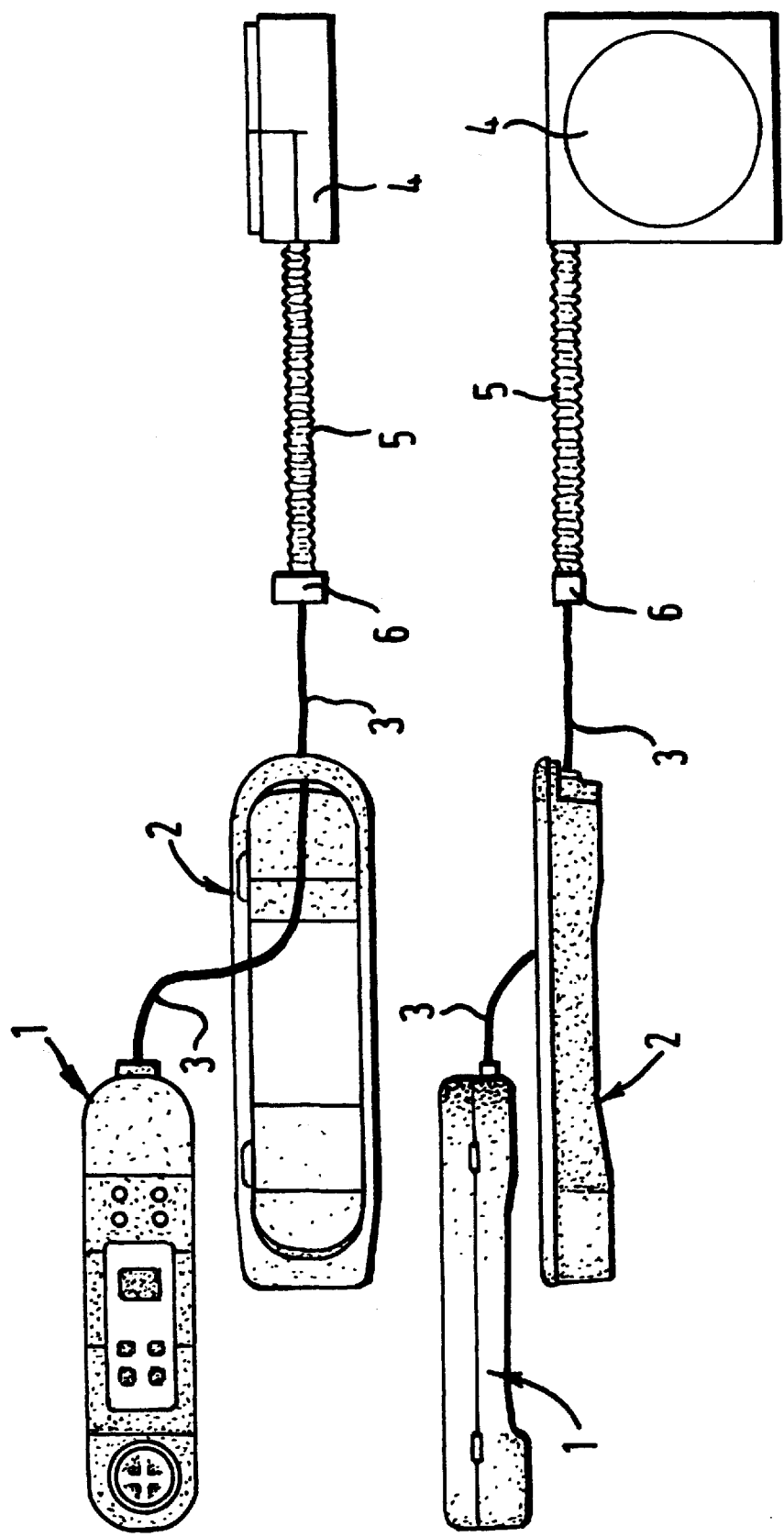
FIG. 1 is a general schematic arrangement in plan and side elevation of a conventional chair arm mounted cradle and handset.

In FIG. 1 handset 1 is securable in cradle 2. The handset 1 is connected to a cable 3 which extends to cable reel 4. The cable passes out of cradle 2 via an aperture (not shown) and for a large part of its length is shielded by a reinforced flexible conduit 5 as is well known. One end of the conduit 5 is secured adjacent the cable reel 4 and the other end is secured by a clip 6 which allows free passage of the cable 3 but holds the conduit 5. The clip 6 is secured close to the cradle 2.

Figure 3:
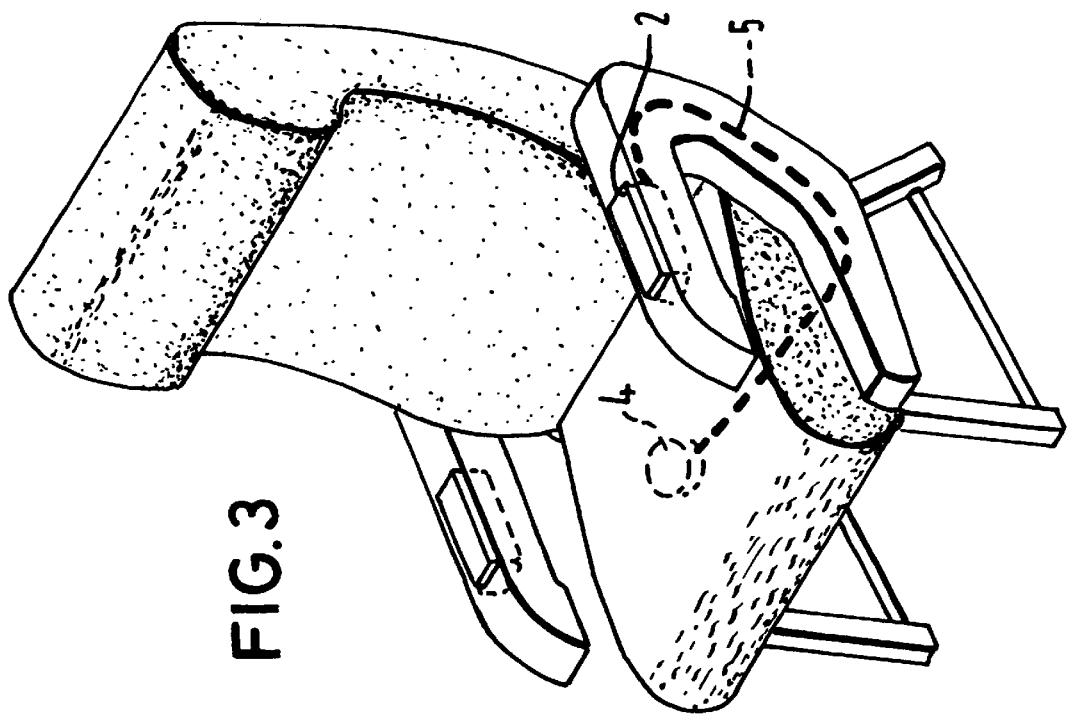
FIG. 3 is a schematic perspective view of a conventional chair arm mounted cradle and handset showing chair mounting of the cable reel.
Figure 2:
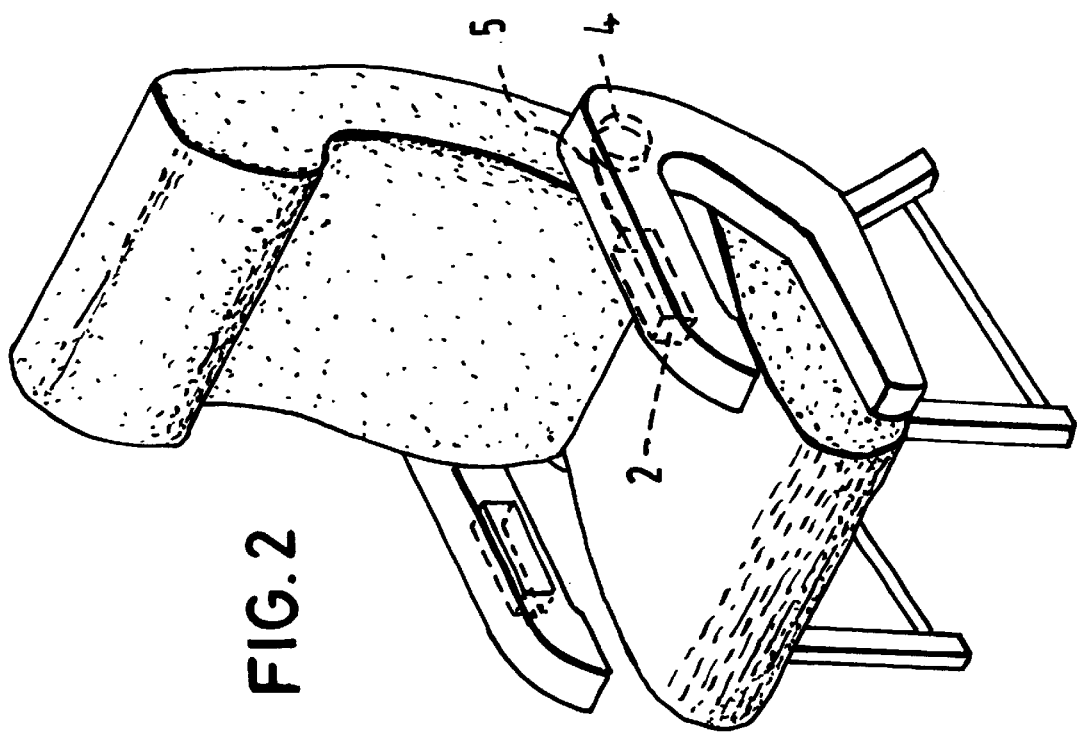
FIG. 2 is a schematic perspective view of a conventional chair arm mounted cradle and handset showing arm mounting of the cable reel.

FIGS. 2 and 3 show the path of the conduit 5 from the cable reel 4 to the cradle 2 and it can be seen that in FIG. 3 the passage from cable reel 4 to the cradle 2 is not a straight line and kinks in the pathway can lead to friction between the conduit 5 and the cable 3. To fit a cradle as shown in FIGS. 1 to 3 requires the installer to separately secure the cable reel 4 and cradle 2, to lead the cable 3 in its conduit 5 to the required position, to secure the conduit 5 to the clip 6, to secure the clip 6 either to the chair arm or the cradle 2, and to connect the cable 3 to the handset 1.

Figure 4:
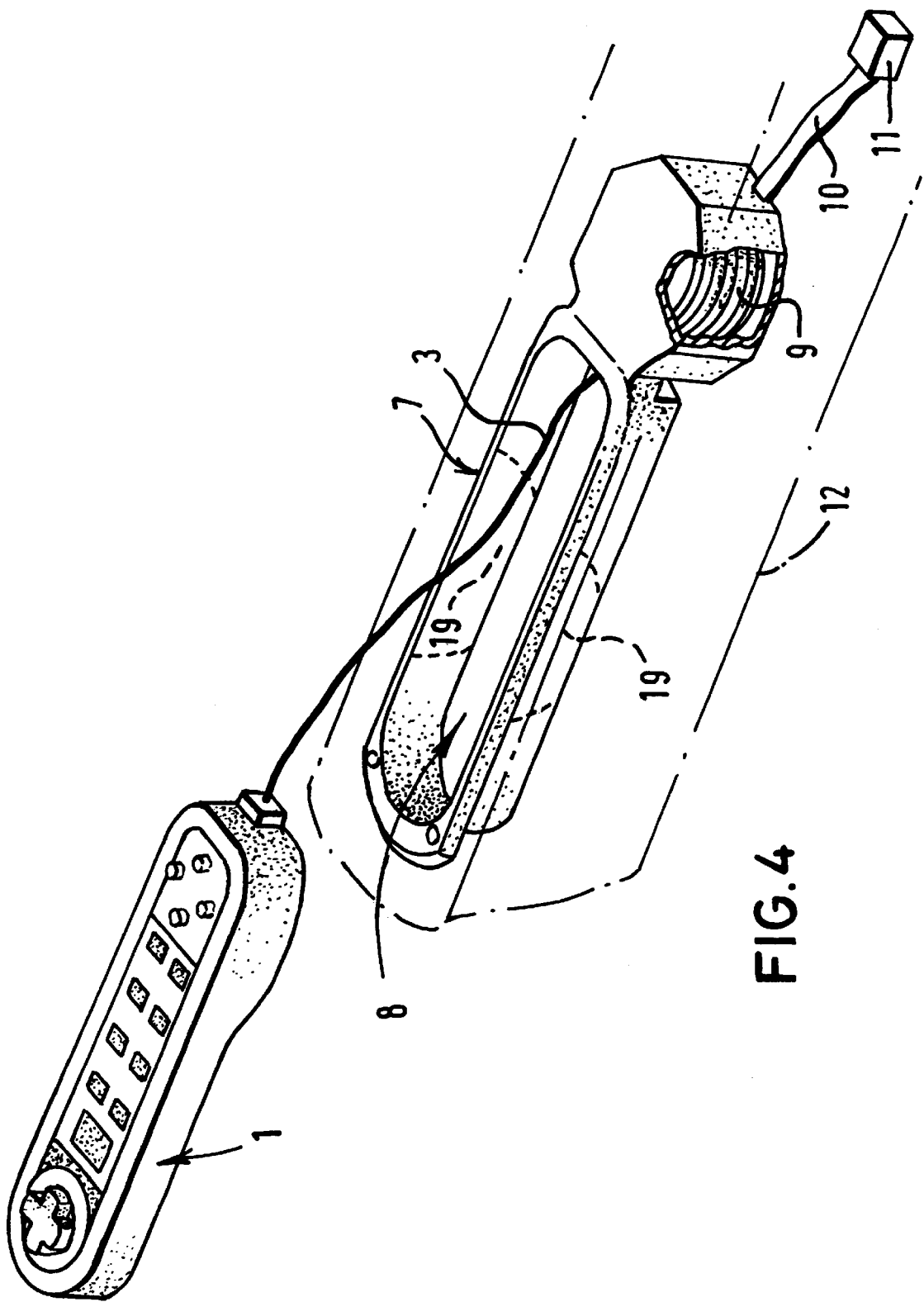
FIG. 4 is a schematic perspective view of a cradle embodying the invention in its first aspect.

FIG. 4 shows a first embodiment of the cradle of the invention. Handset 1 is securable in cradle 7 which comprises a recess 8; the catch used to secure the handset in the cradle being of a non-visible type. The handset 1 is connected to a cable 3 which extends via an aperture (not shown) to integral cable reel or spool 9 housed in cradle 7. The integral cable reel 9 may be of any conventional type but conveniently may be of the known ratchet type such as, for example, supplied by MBM Technology Limited under part number ACEEC 1106-A. Cable 10 extends from the integral cable reel 9 to a connector 11.

The cradle 7 may be mounted in a chair arm 12 (shown as broken lines) and connector 11 simply joined to a connector to external apparatus. This is a drastically simpler procedure than fitting the prior art chair arm cradles of FIGS. 1 to 3.

Figure 5:
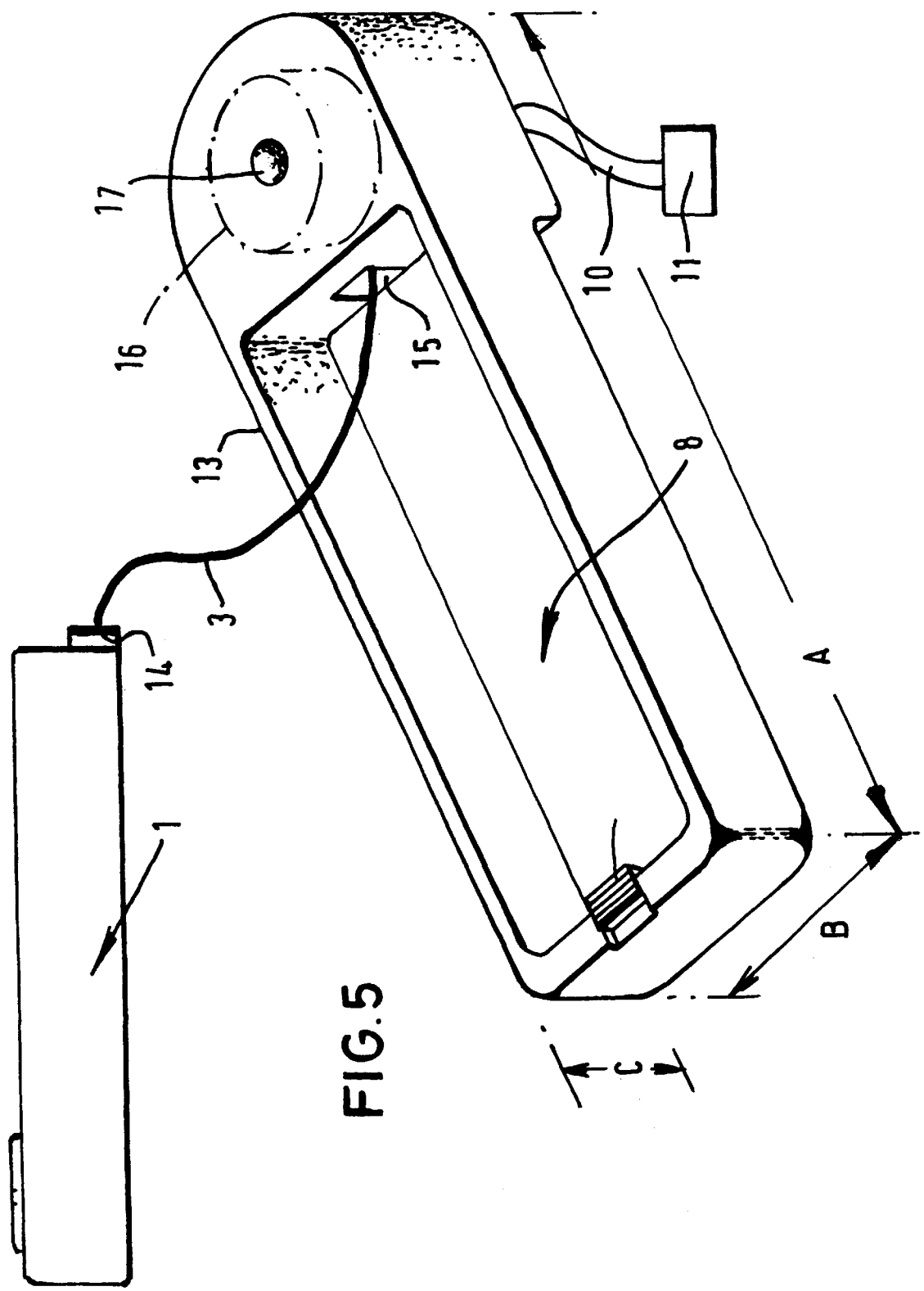
FIG. 5 is a schematic perspective view of a second embodiment of cradle.

FIG. 5 shows handset 1 securable in cradle 13 which comprises a recess 8. The handset 1 is connected by a fitting 14 to a cable 3 which extends through aperture 15 to an integral cable reel 16 (shown schematically in broken lines) housed in cradle 13.

The integral cable reel is of a manual pull, spring biased return, push button release type and may be, for example, such as disclosed in GB-A 2210020, or as described below. Push button 17 on the surface of cradle 13 may be used to release a ratchet or cam operating on cable reel 16 so allowing spring bias to retract the cable. It will be clear to the person skilled in the art that many types of manually released cable reels may be used and this invention is not limited to ratchet mechanisms nor to push button release. Slide buttons, toggle switches and other releases may be used to release the cable for return to the cable reel.

The cable reels in FIGS. 4 and 5 are shown lying generally horizontally but this is not essential, the position of the reel being chosen to suit the dimensions available for the cradle. For narrow but deep chair arms vertical mounting of the reel may be more appropriate.

By choice of a suitably compact reel (such as the MBM Technology Limited reel part number ACEEC1106-A mentioned above) it is possible to mount two cradles back to back and in the side of an aircraft chair arm to allow two passengers to use the handsets simultaneously. Typical dimensions of the cradle of FIG. 5 are length A about 27.5 cm, width B about 6.5 cm and depth C about 3.5 cm. It can be seen that in a typical aircraft chair arm of width about 7.5 cm one cradle may be mounted on the top; alternatively two cradles may be mounted in the opposed sides of another form of aircraft chair arm which is typically 5.0 cm wide and 7.5 cm deep. The disclosed cradle may readily fit partly recessed within a space 28.5×7.5×7.5 cm, preferably 28.5× 7.5×2.5 cm and is therefore adapted for location in chair arms. The integrated cable reel greatly simplifies installation and servicing.

Cable 10 extends from the integral cable reel to a connector 11.

When in its rest position, cradled in the recess 8, the cable fitting 14 nests inside aperture 15 so that the cable 3 is concealed from view, and inadvertent snagging, by the handset 1. To avoid inadvertent release of the handset a catch 18 is provided. Any form of catch may be used such as, for example: a spring arm that engages with the handset on the handset's return to its cradled rest position and is displaceable manually to release the catch; a magnetic catch releasable simply on tugging the handset; a spring loaded ball catch engaging with an indentation on the handset. Other means of releasing the catch may be used, for example coin or card released catches may be used for paid systems. It will be clear that many variants are possible to meet the purpose of the catch, namely to releasably secure the handset in its cradled rest position.

In use the handset of FIGS. 4 and 5 sits in the recess 8 and is removable therefrom by lifting substantially along a single removal axis (i.e. a roughly vertical axis), removal of the handset obliquely to said single removal axis being restrained by the walls of the recess. This reduces the risk of accidentally removing the handset from its cradled rest position. It will be apparent to the person skilled in the art that that any form of walls will suffice and they need not be continuous. For example side panels 19 (shown in broken lines on FIG. 4) could be removed leaving a shoe at either end of the recess restraining the handset from lateral movement. Other constructions such as upstanding pins will perform the same service.

In FIG. 4 the cradle is shown recessed into the arm of a chair. It will be apparent that full recessing or partial recessing are options that can be followed with the present invention as required.

Figure 6:
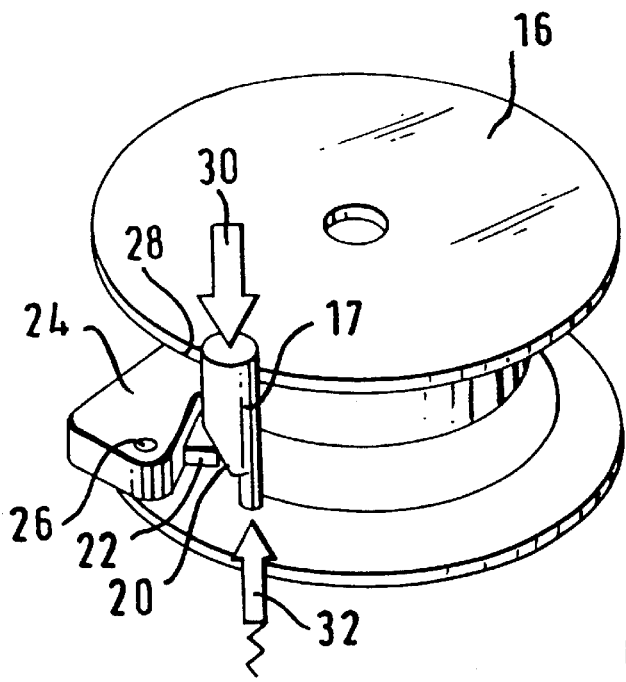
FIG. 6 is a perspective view of a winding mechanism such as may form a part of the invention in its second aspect.

FIG. 6 shows a cable spool 16 and a braking/release mechanism similar to those used in the cradle of FIG. 5. As shown the release means comprise a pushbutton 17 which has a cam surface 20 which acts on a protruberance 22 of braking means formed by cam 24 which in turn is pivotally mounted on an axle (not shown) passing through a hole 26. Spool 16 rotates clockwise (as viewed in FIG. 6) when cable is withdrawn. The braking face 28 of cam 24 is lightly biased into contact with the spool 16 and increases in radius about the hole 26 in an anticlockwise direction. The spool is biased by a spiral spring (not shown) to rotate anticlockwise and rewind the cable. Normally, however, such rewinding will be arrested by the cam 24, which is pulled clockwise into tight frictional engagement with the spool 16. Pushing down on button 17 as indicated by arrow 30 causes cam surface 20 to act on protruberance 22, rotating the cam 24 anticlockwise out of engagement with the spool 16, permitting the cable to rewind under the action of the rewind bias. The button 17 is biased upwardly as indicated at 32, allowing the cam 24 to return into contact with the spool 16 when the button 17 is released. If the cable is then extended, the spool 16 is rotated clockwise and the braking face 28 of the cam 24 slips on the rim of the spool with which it makes contact. It is a feature of the second aspect of the invention that latch means (not shown in FIG. 6) are provided which can hold the release means operated, for rotation of the spool 16 in the rewind direction.

Figure 12:
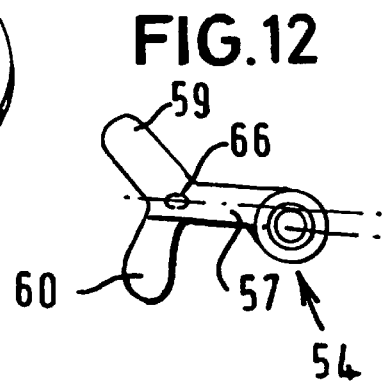
FIG. 12 is a plan view of a latch shown in FIG. 7.
Figure 8:
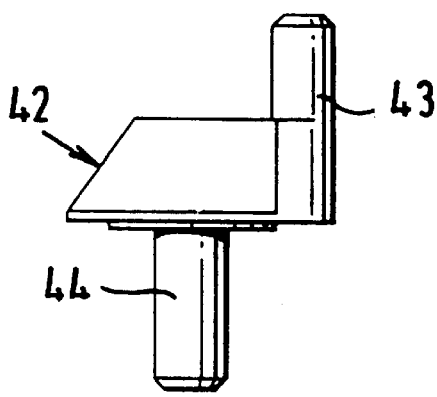
FIGS. 8 and 9 are respective side and plan views of a toggle link shown in FIG. 7.
Figure 9:
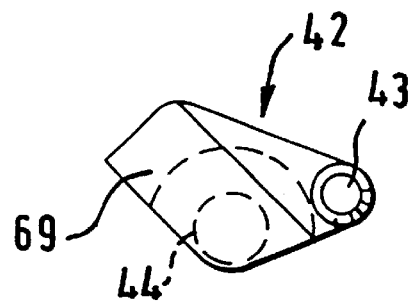
Figure 10:
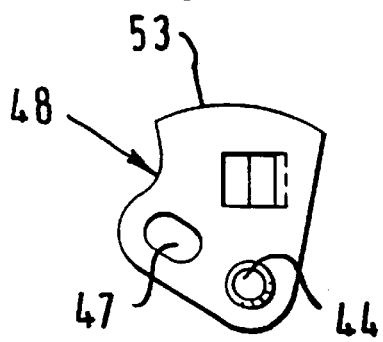
FIGS. 10 and 11 are respective plan and side views of a brake cam shown in FIG. 7.
Figure 11:
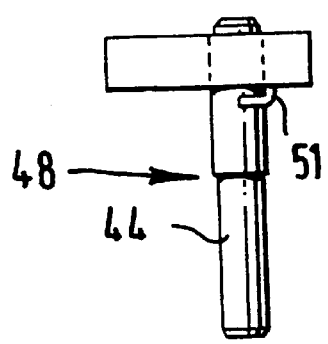
Figure 7:
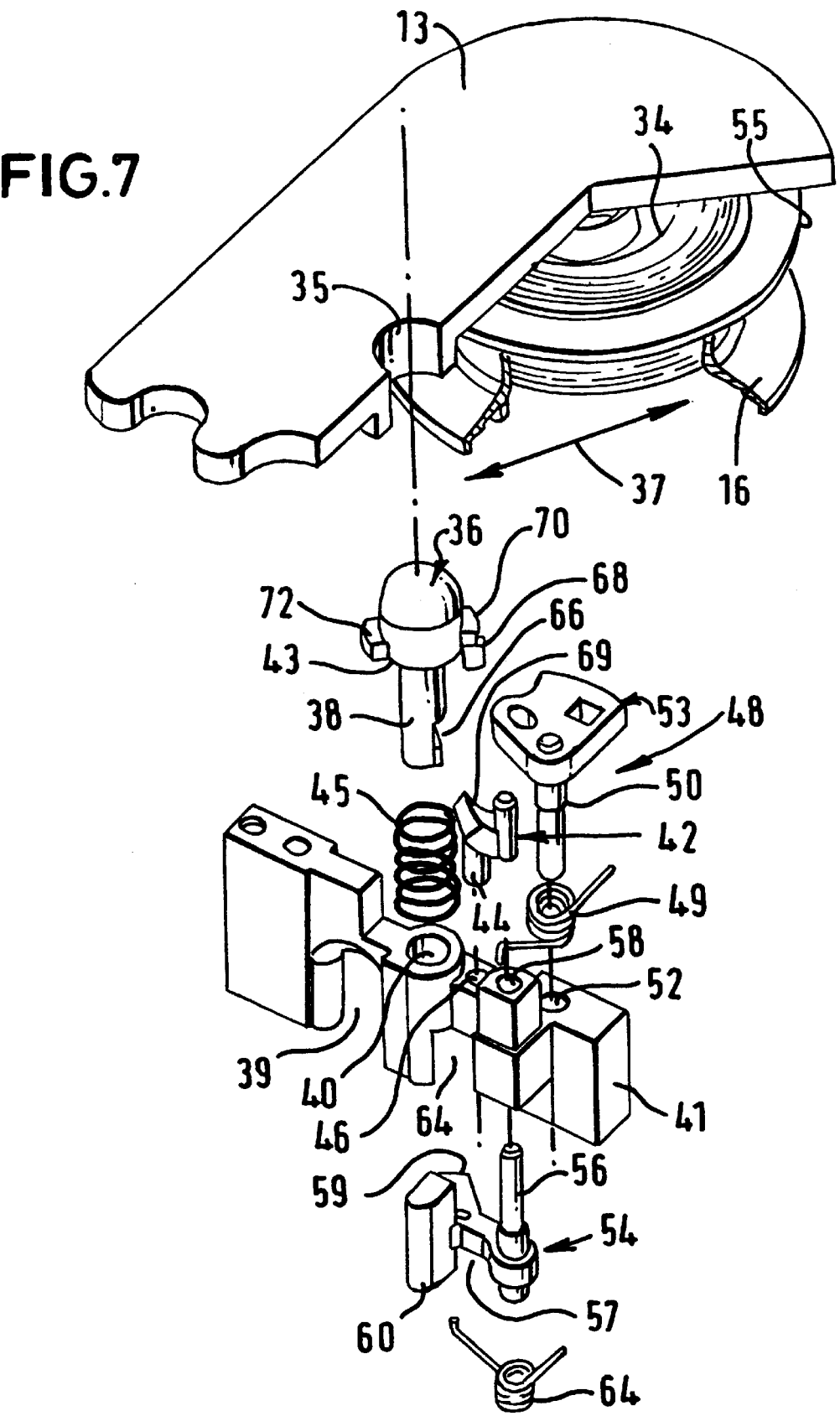
FIG. 7 is an exploded perspective view of a first embodiment of the inventive winding mechanism.
Figure 17:
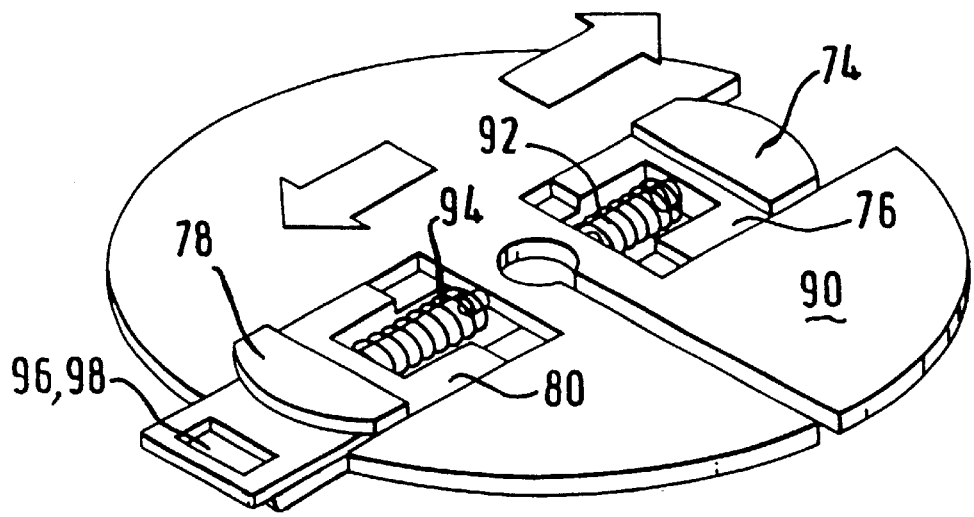
Figure 18:
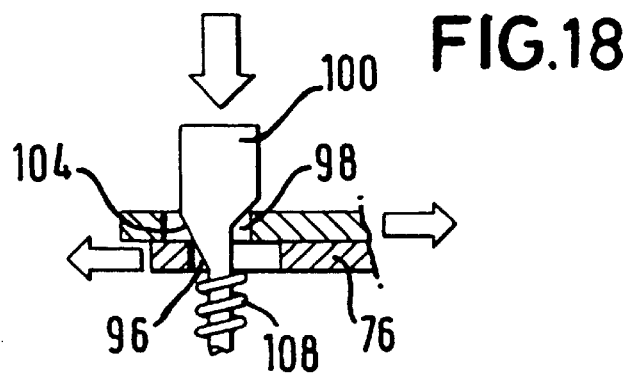

In FIG. 7 a spool 16 is housed in a cradle 13 with a spiral spring 34 providing rewind bias. Pushbutton release means 36 are received in a hole 35 in cradle 13. A shaft 38 of button 36 is slidably received in a hole 40 formed in a mounting block 41 screwed to the floor of the cradle 13. A compression spring 45 surrounding the shaft 38 is received between the mounting block 41 and a shoulder 43A on the button. A toggle link 42 (see also FIGS. 8 and 9) has a shaft 44 journalled in a hole 46 in block 41. A braking cam 48 (see also FIGS. 10 and 11) has a shaft 50 journalled in a hole 52 in block 41. A pin 43 of toggle link 42 is rotatably and slidably received in a slot 47 formed in cam 48. A torsion spring 49 has one arm braced in a hole (not shown) in the mounting block 41 and another arm held by a tang 51 on the cam 48 to bias it clockwise and bring a braking surface 53 into contact with a rim 55 of the spool 16. The radius of surface 53 increases in an anti- clockwise direction about shaft 44 as shown in FIG. 10. Cable (not shown) is drawn from and rewound onto the right hand side of the spool 16, as indicated by arrow 37. The cable passes through a smooth edged guide eye 39 in block 41, into the recess in the cradle body in which the handset is received. The cam braking surface 53 slides on the rim 55 to allow extension of the cable, but is wedged against rim 55 to prevent spring 34 from rewinding the cable. Latch means 54 (see also FIG. 12) comprising a lever 57, a finger 59 and a trigger 60 have a shaft 56 journalled in a hole 58 in the mounting block 41. Finger 59 extends into an aperture 62 in block 41 that communicates with button shaft hole 40. Lever 57, finger 59 and trigger 60 are biased outwardly towards the handset recess by a torsion spring 64 mounted on shaft 56 with one end braced in a groove (not shown) in the lower face of block 41 and another end received in a hole 66A in lever 57.

As shown in FIG. 13, when the button 36 is in its normal raised position, spring 64 holds the finger 59 against the rear of the lower end of button shaft 38 in the aperture 62. Depressing the button 36 as in FIG. 14 causes the finger 59 to enter a detent groove 66 formed in the button shaft 38, latching the button depressed. As the button 36 is moved downward towards its latched state, a depending foot 68 provided on a button lug 70 engages a cam surface 69 on the toggle link 42, rotating the toggle link clockwise as shown in FIG. 7. Lugs 70,72 slide in grooves (not shown) provided in the cradle 13 to prevent the button 36 from rotating about its shaft 38. The toggle pin 43 rotates the cam 48 anti-clockwise to bring its braking surface 53 out of contact with the spool rim 55, allowing spring 34 to rewind the cable. As the handset (not shown) is replaced in the cradle 13, it presses against the trigger 60, disengaging the finger 59 from the detent groove 66, allowing the button 36 to pop up, releasing the cam 48 for contact between braking surface 53 and spool rim 55.

Figure 19:
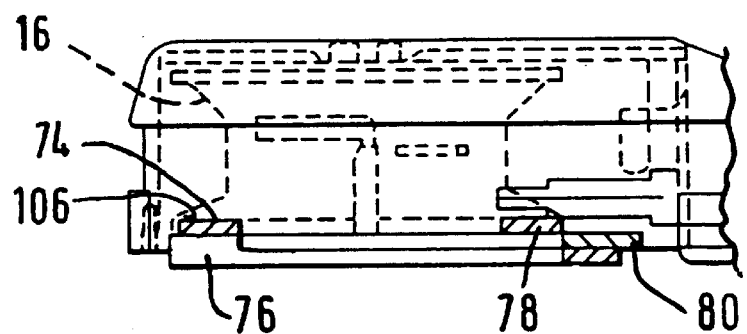

An alternative construction for the brake means is shown in FIGS. 15–19. A first brake shoe 74 is carried by a slide plate 76. A second brake shoe 78 is carried by a body 80 slidable on plate 76, guided by depending flanges received in cutouts 84 in the plate 76. The shoes, plate 76 and body 80 slide in slots 86,88 in a stationary spool base plate 90. The shoe 74 and slide plate 76 are biased outwardly of the base plate 90 by a spring 92. Similarly body 80 and shoe 78 are biased outwardly by a spring 94. The slide plate 76 and body 80 include respective overlapping apertures 96,98 shown in section in FIG. 18. The shaft of a button 100 passes through the apertures 96.98 and includes camming surfaces 102,104 which urge the slide plate 76 and body 80 in opposite directions when the button 100 is pressed, moving the shoes 74,78 inwardly. In their outward position, the shoes 74, 78 are urged against an inner rim 106 of a cable spool 16 (FIG. 19). The button 100 may be urged upwardly by a spring 108. Latch means such as described elsewhere in this specification are used to hold the button 100 depressed.

FIG. 16 shows an alternative, self-tightening brake shoe construction. The shoe includes a pair of cut outs defining a flexible finger 75 offset from the diameter of the base plate 90 and protruding slightly from the remainder of the shoe so that it flexes and slips with respect to the spool rim 106 as the spool is rotated in the one direction, but wedges against the rim 106 as the spool rotates in the rewind direction.

FIGS. 20–23 show another brake means construction. A rotatable base plate 110 is carried by a shaft 112 of spool 16. A pair of brake shoes 114,116 slide in diametrically opposed guide slots 118,120 in plate 110. The shoes 114,116 have pins 122 which engage in sort spiral slots 124 in a fixed base plate 126. Plate 110 has a radially projecting tab 128 shown in section in FIG. 21. A button 130 has a shaft passing through a hole 132 in tab 128, with a camming surface 134 which urges the plate 110 in a clockwise direction, as viewed from below, when the button is pressed. Return springs 136, 138 are provided; spring 136 urging the plate 110 anticlockwise so that the shoes move outwardly in slots 118,120 and 124 to engage the inner rim 106 of the spool 16. Button latching means (not shown) are again provided.

Figure 24:
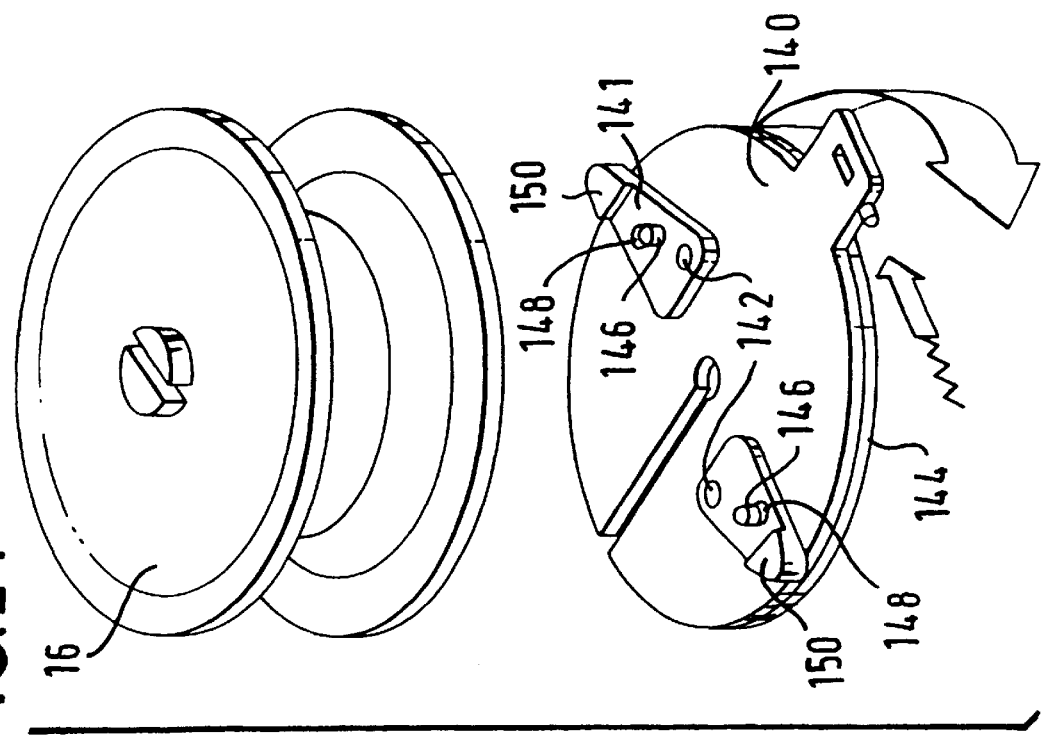
FIGS. 24–26 show a fourth embodiment of the winding mechanism.
Figure 22:
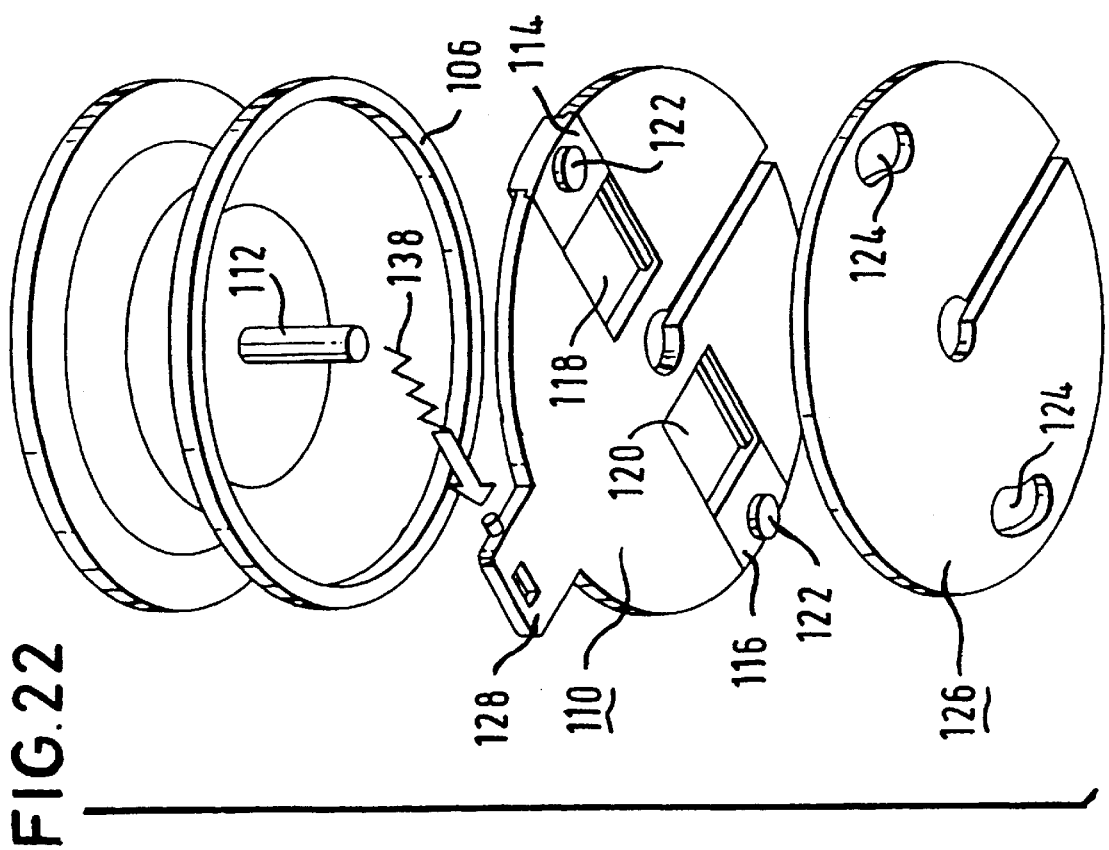
Figure 23:
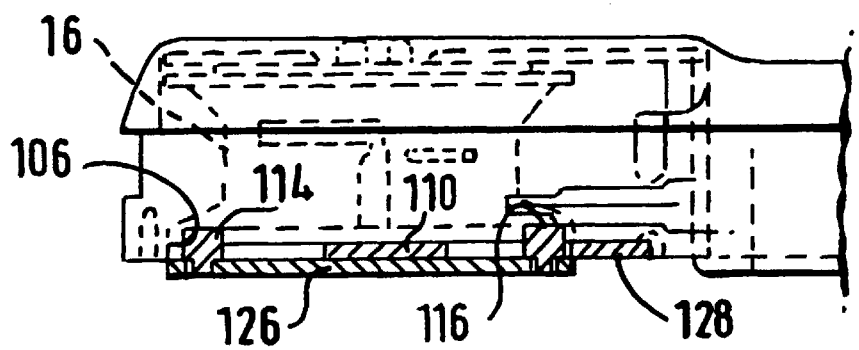
Figure 25:
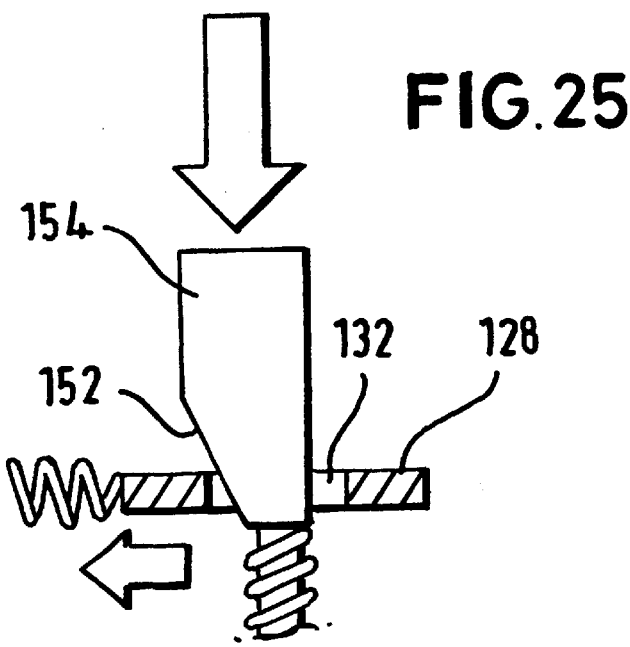
Figure 26:
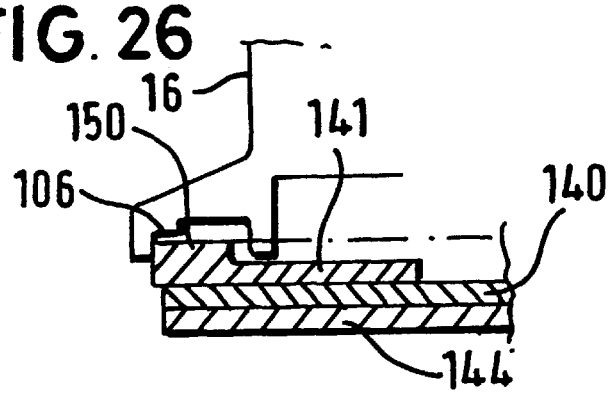

FIGS. 24–26 show yet another brake means construction. A pair of arms 141 are mounted on a rotatable base plate 140 by pivots 142. A fixed base plate 144 has a pair of pins 146 engaged in respective cam slots 148 formed in the arms 141. Anticlockwise rotation of the plate 140 (viewed from above) swings the arms 141 radially outwardly to bring lobes 150 at the tips of the arms into contact with the spool inner rim 106. A projecting tab 128 with a hole 132 is again provided, but this time a cam surface 152 of a button 154 is arranged to rotate the plate anticlockwise as the button is depressed (FIG. 25).

Figure 27:
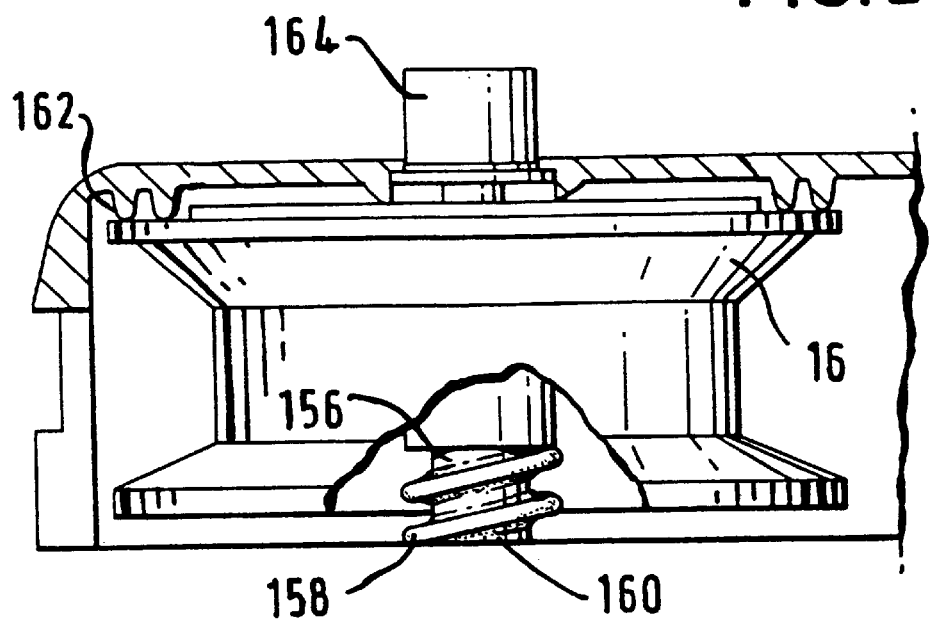
FIG. 27 shows a fifth embodiment of the winding mechanism.
Figure 31:
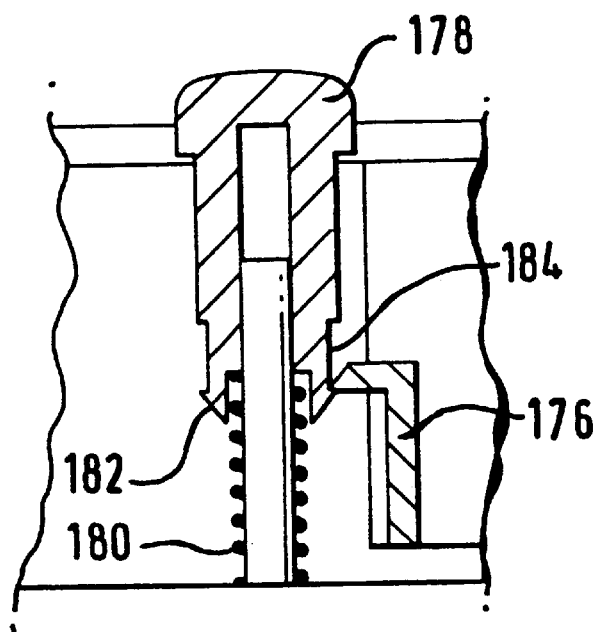
FIGS. 28–31 show a sixth embodiment of the winding mechanism.

FIG. 27 shows further alternative brake means. Spool 16 comprises a hub 156 engaged with a lazy thread 158 on shaft 160 which in turn is rotatably mounted in the cradle and acted upon by a rewind bias spring (not shown). An end face of the spool 16 is lightly biased into contact with braking ribs 162 formed on the cradle. The rewind bias acts on the shaft in the clockwise direction as viewed from below and, due to the threads 158, causes the spool to migrate along the shaft 160 into firm contact with the ribs 162. Rewind motion of the spool is thereby arrested. On the other hand, pulling on the cable applies a counter torque which tends to disengage the spool from the ribs 162, allowing extension of the cable. A button 164 is provided which when pressed acts to displace the spool away form the ribs 162, allowing the cable to rewind. Button latching means (not shown) are again provided.

Figure 28:
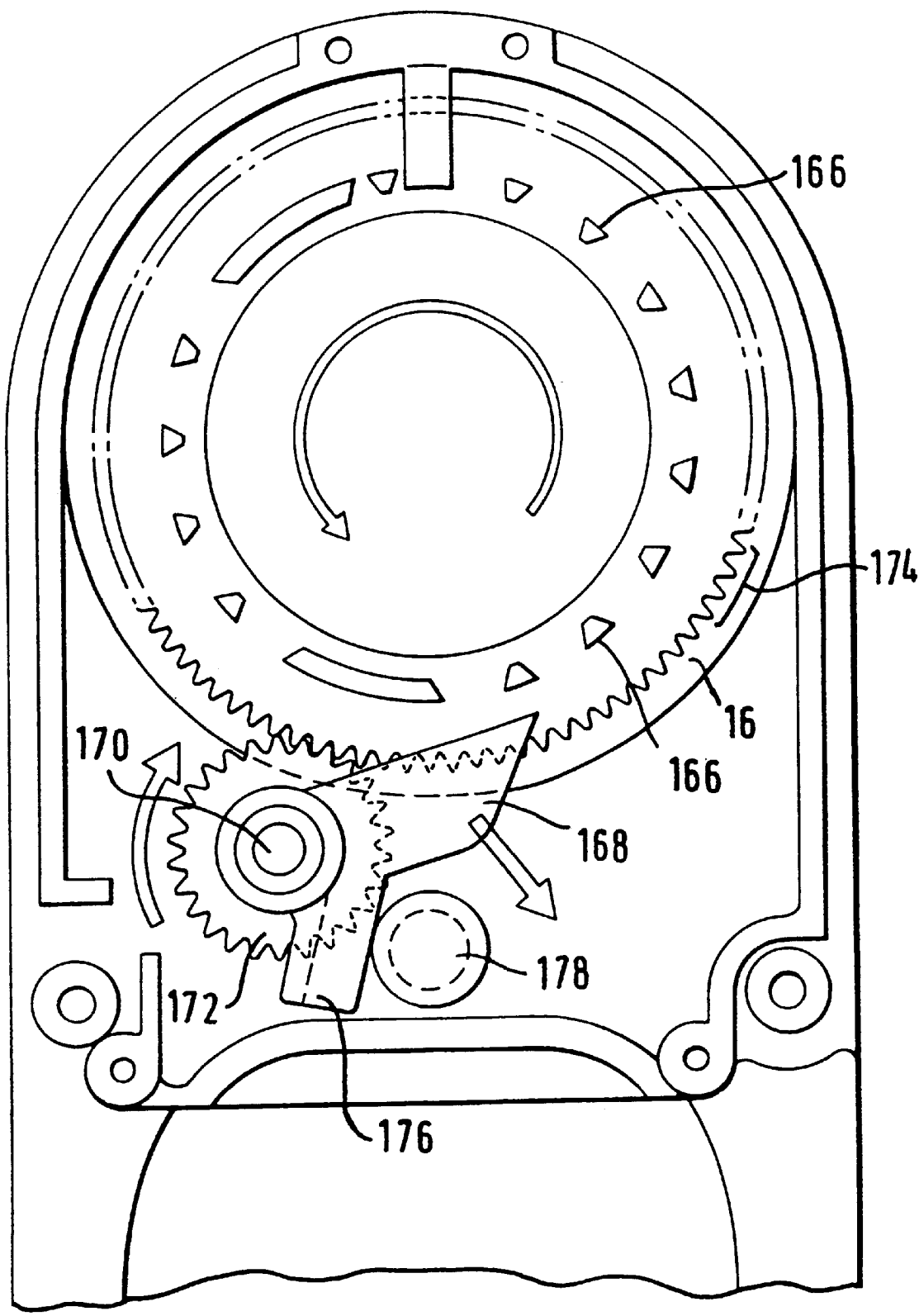
Figure 29:
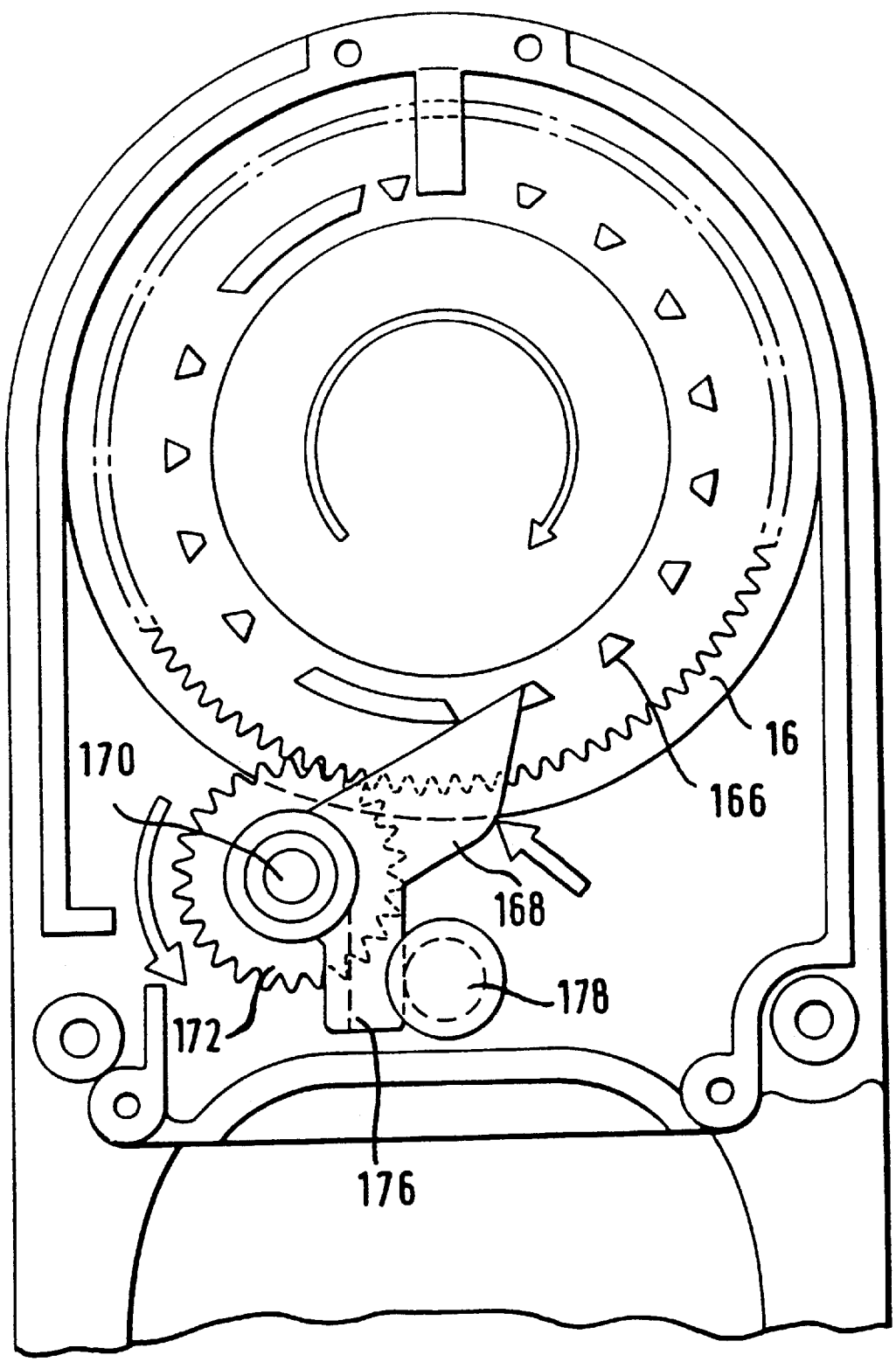
Figure 30:
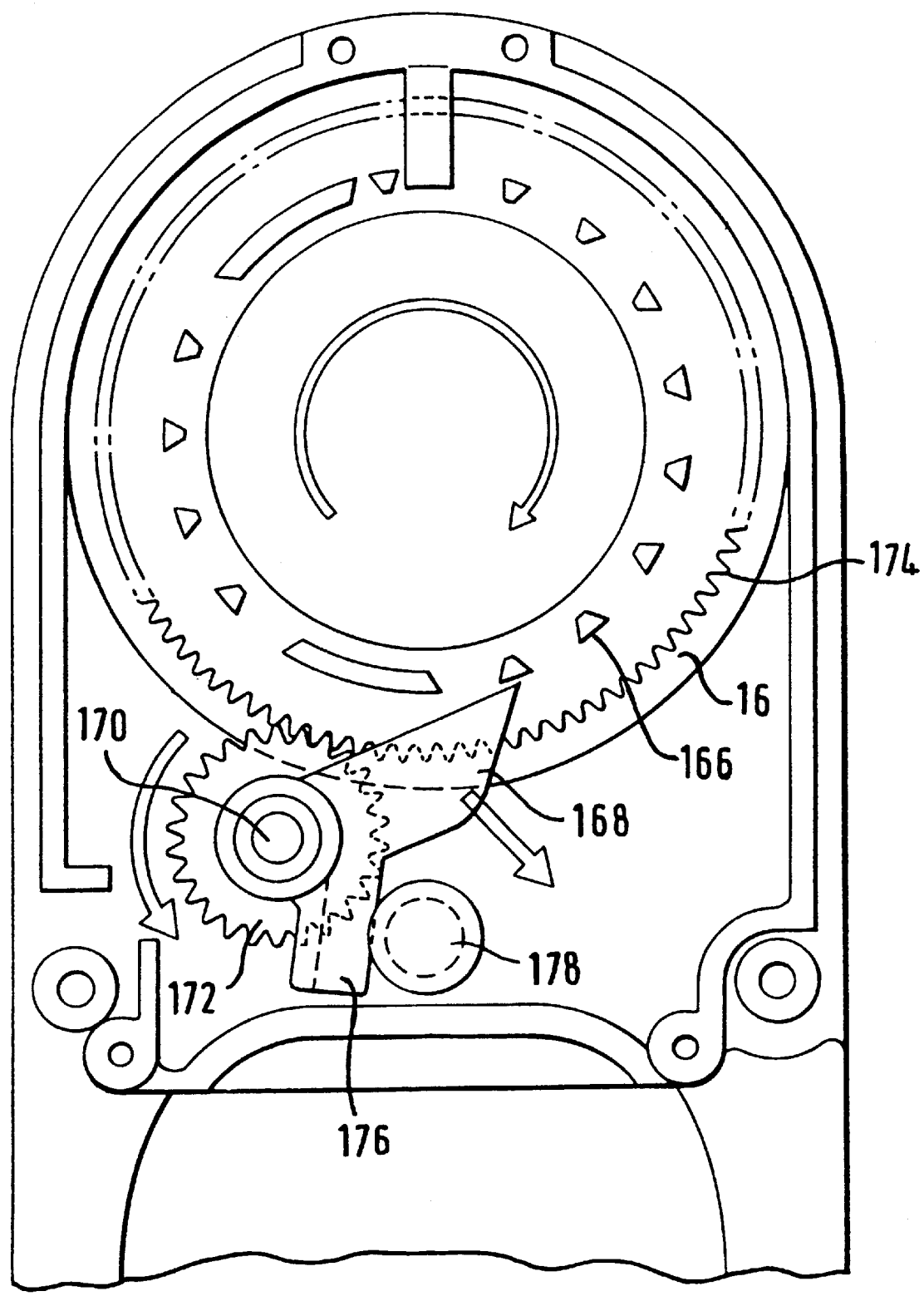

In the embodiment of FIGS. 28–31, the spool 16 has ratchet teeth 166 on one end face engageable with a pawl 168 mounted on a shaft 170. The shaft 170 also carries a pinion gear 172 in engagement with teeth 174 moulded into the spool 16. A face of the pinion gear 172 is in frictional engagement with the pawl 168. Extension of the cable rotates the spool 16 anticlockwise and the pinion gear 172 clockwise. This, together with conventional camming action between the pawl 168 and ratchet teeth 166, rotates the pawl out of engagement with the ratchet teeth 166 (FIG. 28). Further extension of the cable causes the pinion gear 172 to slip relative to the pawl 168. When the cable is released, the rewind bias spring (not shown) rotates the spool 16 clockwise a short distance, rotating pinion wheel 172 anticlockwise, bringing the pawl 168 into locking engagement with the ratchet teeth 166. In this way the cable is locked in the extended position (FIG. 29). As shown particularly in FIGS. 30 and 31, the pawl comprises a lever arm 176 co-operable with a release button 178. Depressing the button 178 against a return spring 180 causes a shoulder 182 on the button to move arm 176 and pawl 168 clockwise (FIG. 30), so releasing the pawl from the teeth 166 for rewinding of the cable. The button 178 comprises a groove 184 engaged by the arm 176 forming a detent of latching means which hold the button down against spring 180 until the cable is extended again, whereupon the arm 176 is rotated by pinion gear 172 out of engagement with the groove 184, allowing the button 178 to pop up.

FIGS. 32 and 33 show an embodiment of the invention in its third aspect. The illustrated handset cradle comprises a body 200 having a panel mounting lip 202 providing a locating shoulder 204 for positioning the cradle at the desired depth in an aperture formed in a panel 206. A handset (not shown) is stowed in a recess 207 accessible from in front of the panel 206. A cord reel 208 is positioned laterally of the recess 207, below the shoulder 204, so that it is covered by the panel 206. The aperture in the panel 206 is therefore of the same size as would be required for an equivalent cradle having a remotely located cradle reel. On installation, the reel 208 is first fed through the panel aperture and the shoulder 204 then brought into its final position, abutting the panel aperture edges.

It will be readily understood that any of the various release means, brake means and latch means described above may be appropriately combined to form a winding mechanism in accordance with the second aspect of the invention. Indeed, the various means described are merely illustrative and other arrangements fulfilling the functions defined in the claims can be envisaged. Instead of being released by pulling on the cable or replacing the handset in the cradle, the latch means may comprise a hand actuated release control such as a pushbutton, lever, slide, knob or switch.

What is claimed is:

1. A winding mechanism comprising a spool rotatable in one direction against a rewind bias torque; brake means having:
   (i) an operative condition in which rotation of the spool in the rewind direction is braked but rotation of the spool in said one direction is allowed, and
   (ii) a released condition in which rotation of the spool in the rewind direction is allowed;
release means actuable to change the brake means from the operative to the released condition, and latch means engageable with the release means for holding the release means in the actuated state whereby the brake means are maintained in the released condition;
in which the mechanism forms part of an apparatus comprising a handset and a cradle having a recess in which the handset may be placed, the latch means comprising a trigger arranged in the recess and actuated by placement of the handset into the recess to disengage the latch means from the release means thereby allowing the brake means to change from the released to the operative condition.

2. A winding mechanism comprising a spool rotatable in one direction against a rewind bias torque; brake means having:
   (i) an operative condition in which rotation of the spool in the rewind direction is braked but rotation of the spool in said one direction is allowed, and
   (ii) a released condition in which rotation of the spool in the rewind direction is allowed;
release means actuable to change the brake means from the operative to the released condition, and latch means engageable with the release means for holding the release means in the actuated state whereby the brake means are held in the released condition, in which rotation of the spool in the one direction biases the latch means out of engagement with the release means.

3. A winding mechanism as defined in claim 2 in which the latch means comprise a pinion wheel rotatably engaged with the spool and a detent rotatable into engagement with the release means by the spool via the pinion wheel and a friction slip connection.

4. A winding mechanism as defined in claim 1 in which the brake means comprise a ratchet and pawl.

5. A winding mechanism as defined in claim 1 in which the brake means comprise a shoe movable relative to the spool which, when brought into contact with the spool is cammed into tighter engagement with the spool to arrest rotation in the rewind direction but which slips relative to the spool to allow rotation of the spool in said one direction.

6. A winding mechanism according to claim 5 in which the shoe is pivoted into contact with the spool by a toggle linkage engaged by a camming surface provided on the release means.

7. A winding, mechanism according to claim 5 in which the shoe engages an inner rim of the spool.

8. A winding mechanism according to claim 7 in which the shoe is mounted to a carrier biased to bring the shoe into engagement with the inner rim and the carrier is selectively translatable by a camming surface on the release means to disengage the shoe from the inner rim.

9. A winding mechanism according to claim 7 further comprising a member rotatable by the release means against resilient bias, there being a connection between the member and the shoe for disengaging the shoe from the inner rim upon rotation of the member.

10. A winding, mechanism according to claim 1 in which the spool is mounted on a rotatable shaft by a lazy thread and the rewind bias torque is applied to the shaft to axially shift the spool and bring an end surface thereof into frictional engagement with an adjacent fixed surface; a counter torque applied to the spool disengaging the end surface from the fixed surface; the release means acting to axially shift the spool to disengage the end surface from the fixed surface.

11. A winding mechanism according to claim 1 in which the brake means are biased towards the engaged condition.

12. A winding mechanism according to claim 1 in which the release means are biased towards the inoperative condition.

\* \* \* \* \*